(12) United States Patent
Cheon

(10) Patent No.: US 12,330,640 B2
(45) Date of Patent: Jun. 17, 2025

(54) DRIVER ASSISTANCE SYSTEM AND DRIVER ASSISTANCE METHOD

(71) Applicant: HL KLEMOVE CORP., Incheon (KR)

(72) Inventor: Seunghun Cheon, Gyeonggi-do (KR)

(73) Assignee: HL KLEMOVE CORP., Incheon (KR)

( * ) Notice: Subject to any disclaimer, the term of this patent is extended or adjusted under 35 U.S.C. 154(b) by 277 days.

(21) Appl. No.: 17/856,813

(22) Filed: Jul. 1, 2022

(65) Prior Publication Data

US 2023/0017438 A1    Jan. 19, 2023

(30) Foreign Application Priority Data

Jul. 12, 2021  (KR) ........................ 10-2021-0091092

(51) Int. Cl.
| | |
|---|---|
| *B60W 30/12* | (2020.01) |
| *B60W 10/20* | (2006.01) |
| *B60W 30/04* | (2006.01) |
| *B60W 30/14* | (2006.01) |
| *B60W 40/105* | (2012.01) |
| *B60W 40/114* | (2012.01) |
| *B60W 40/13* | (2012.01) |
| *B60W 50/14* | (2020.01) |
| *G06V 20/56* | (2022.01) |

(52) U.S. Cl.
CPC ............ *B60W 30/12* (2013.01); *B60W 10/20* (2013.01); *B60W 30/04* (2013.01); *B60W 30/146* (2013.01); *B60W 40/105* (2013.01); *B60W 40/114* (2013.01); *B60W 40/13* (2013.01); *B60W 50/14* (2013.01); *G06V 20/588* (2022.01); *B60W 2300/12* (2013.01); *B60W 2420/403* (2013.01); *B60W 2510/202* (2013.01); *B60W 2520/14* (2013.01); *B60W 2530/10* (2013.01); *B60W 2552/53* (2020.02); *B60W 2710/202* (2013.01)

(58) Field of Classification Search
None
See application file for complete search history.

(56) References Cited

U.S. PATENT DOCUMENTS

| | | | |
|---|---|---|---|
| 2003/0212482 A1* | 11/2003 | Lu ................... | B60G 17/0162 701/45 |
| 2006/0058934 A1* | 3/2006 | Le .................... | B60R 21/0132 280/5.502 |

(Continued)

FOREIGN PATENT DOCUMENTS

| | | |
|---|---|---|
| JP | 2004-338637 | 12/2004 |
| JP | 2010-36645 | 2/2010 |
| KR | 10-0521169 | 10/2005 |

*Primary Examiner* — Christian Chace
*Assistant Examiner* — Shayne M. Gilbertson
(74) *Attorney, Agent, or Firm* — WOMBLE BOND DICKINSON (US) LLLP

(57) ABSTRACT

Disclosed is a driver assistance system including a camera installed in a vehicle, the camera having a field of view around the vehicle and obtaining an image data; and a controller configured to process the image data. The controller performs a lane keeping assistance control for providing an auxiliary steering torque to a steering actuator to maintain a driving lane of a vehicle. The controller changes at least one of a vehicle speed and the auxiliary steering torque depending on a payload of the vehicle during the lane keeping assistance control.

18 Claims, 6 Drawing Sheets

(56) References Cited

U.S. PATENT DOCUMENTS

| | | | | |
|---|---|---|---|---|
| 2014/0081542 A1* | 3/2014 | Yao | ............... | B60W 10/06 |
| | | | | 701/124 |
| 2016/0214620 A1* | 7/2016 | Yang | ............... | B60W 40/114 |
| 2017/0313309 A1* | 11/2017 | Morales Teraoka | ............... | |
| | | | | B60W 50/0098 |
| 2018/0265076 A1* | 9/2018 | Hall | ............... | B60W 10/20 |
| 2019/0193731 A1* | 6/2019 | Irie | ............... | B60W 50/14 |
| 2019/0351906 A1* | 11/2019 | Oh | ............... | B60W 30/0956 |
| 2023/0037472 A1* | 2/2023 | Caldwell | ............... | G06V 20/58 |

* cited by examiner

[FIG. 1]
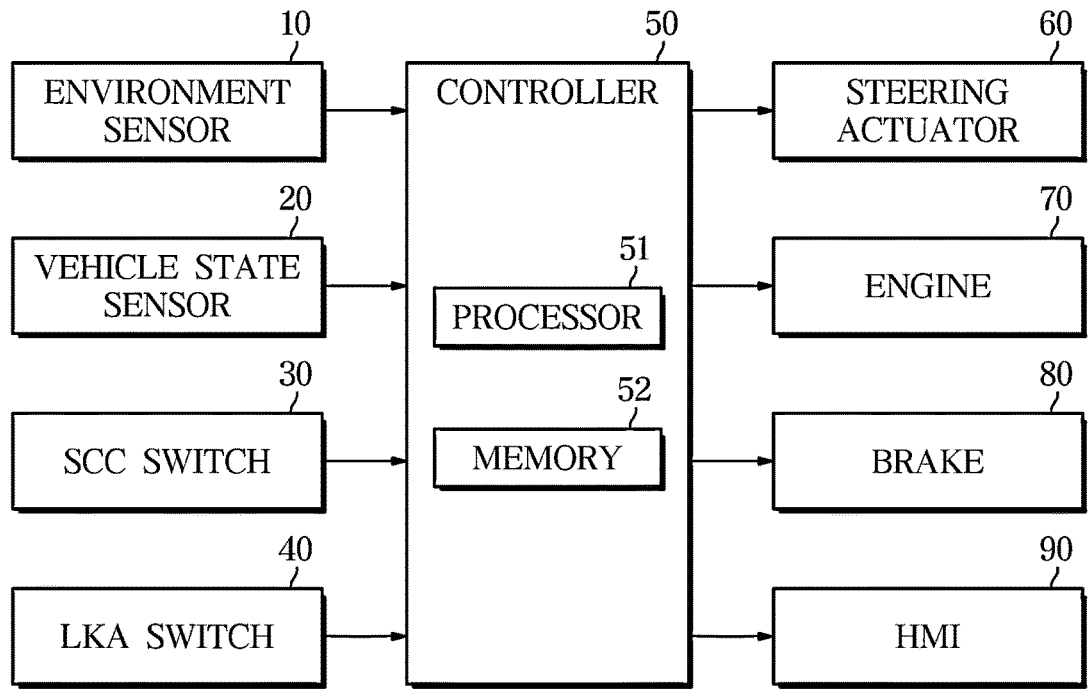
[FIG. 2]
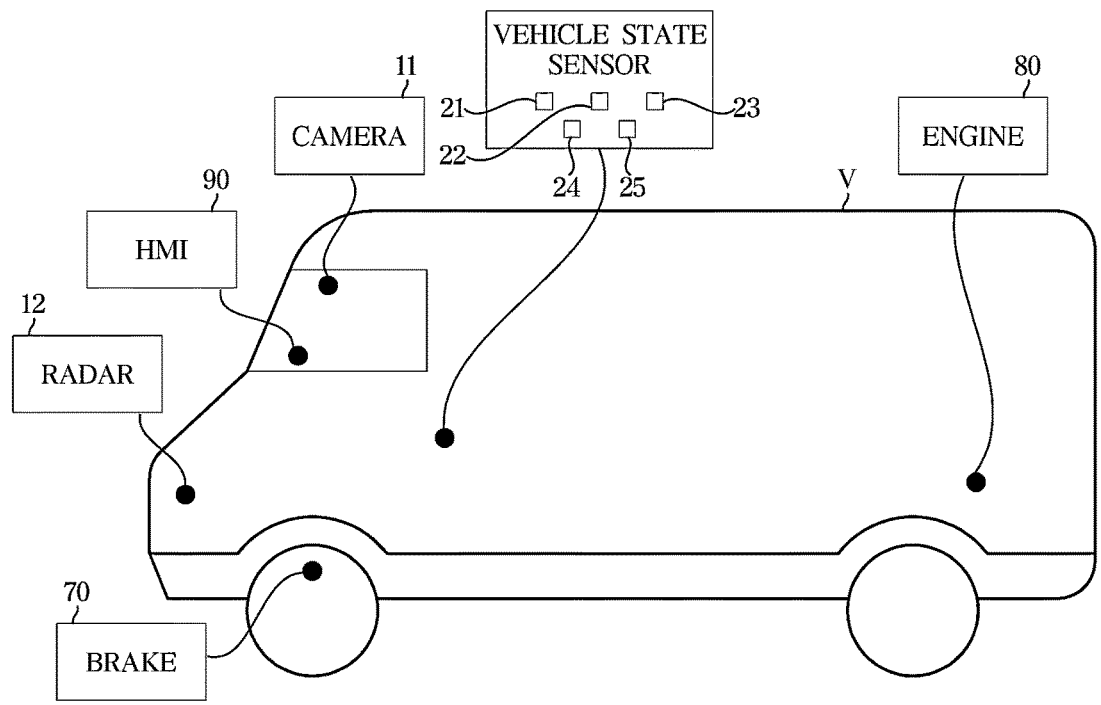

[FIG. 3]
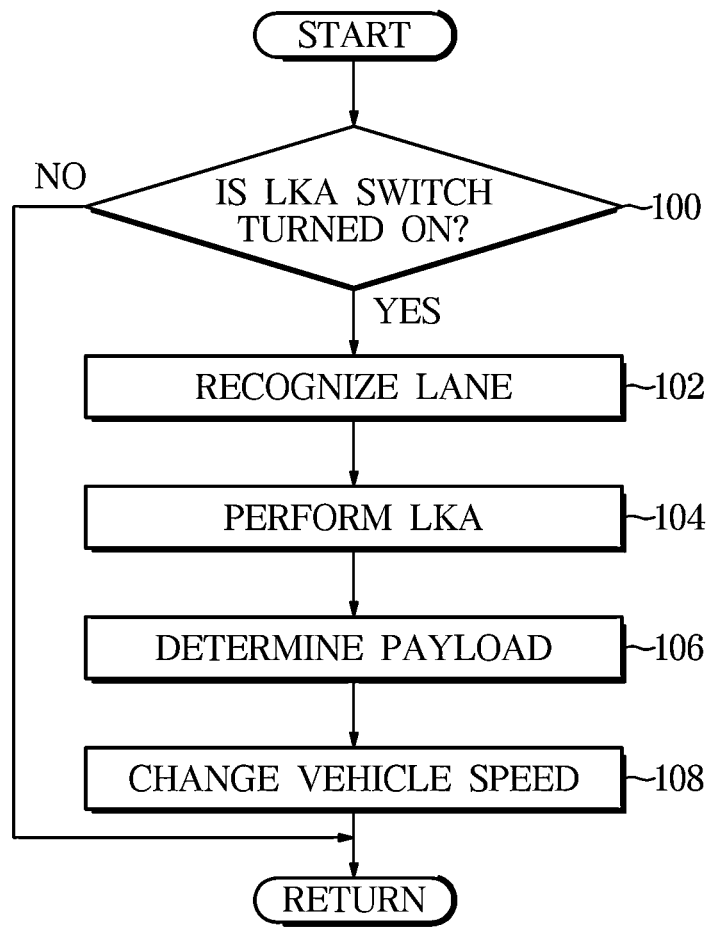

[FIG. 4]
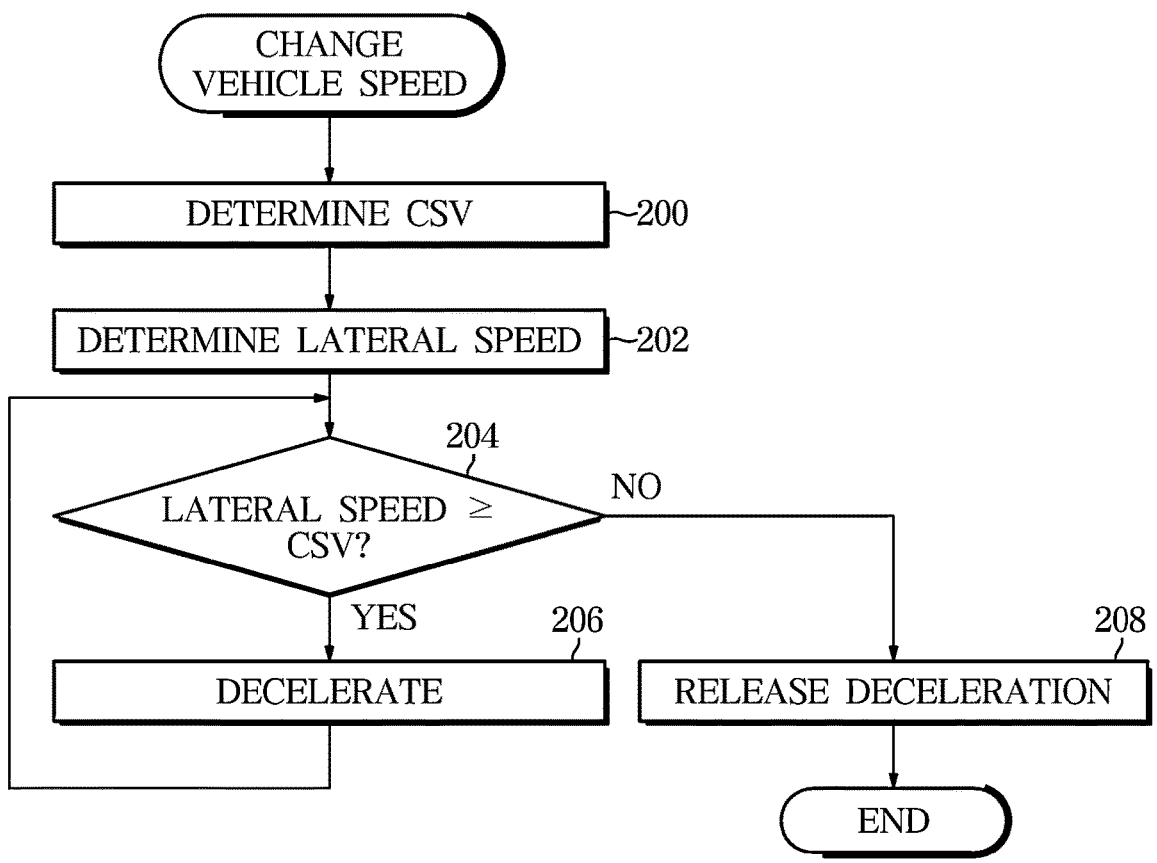

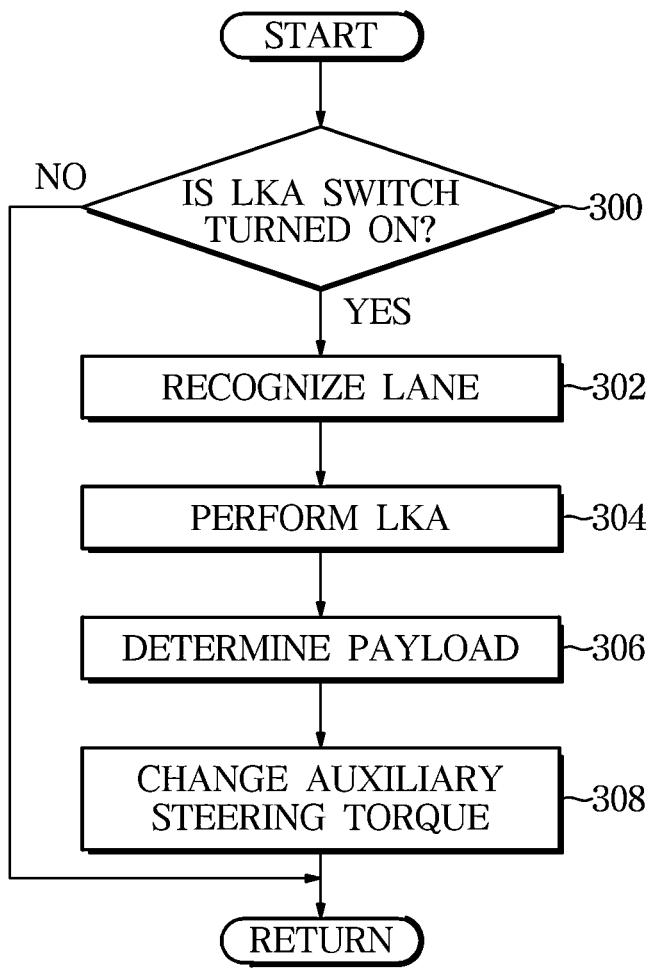
[FIG. 5]

[FIG. 6]
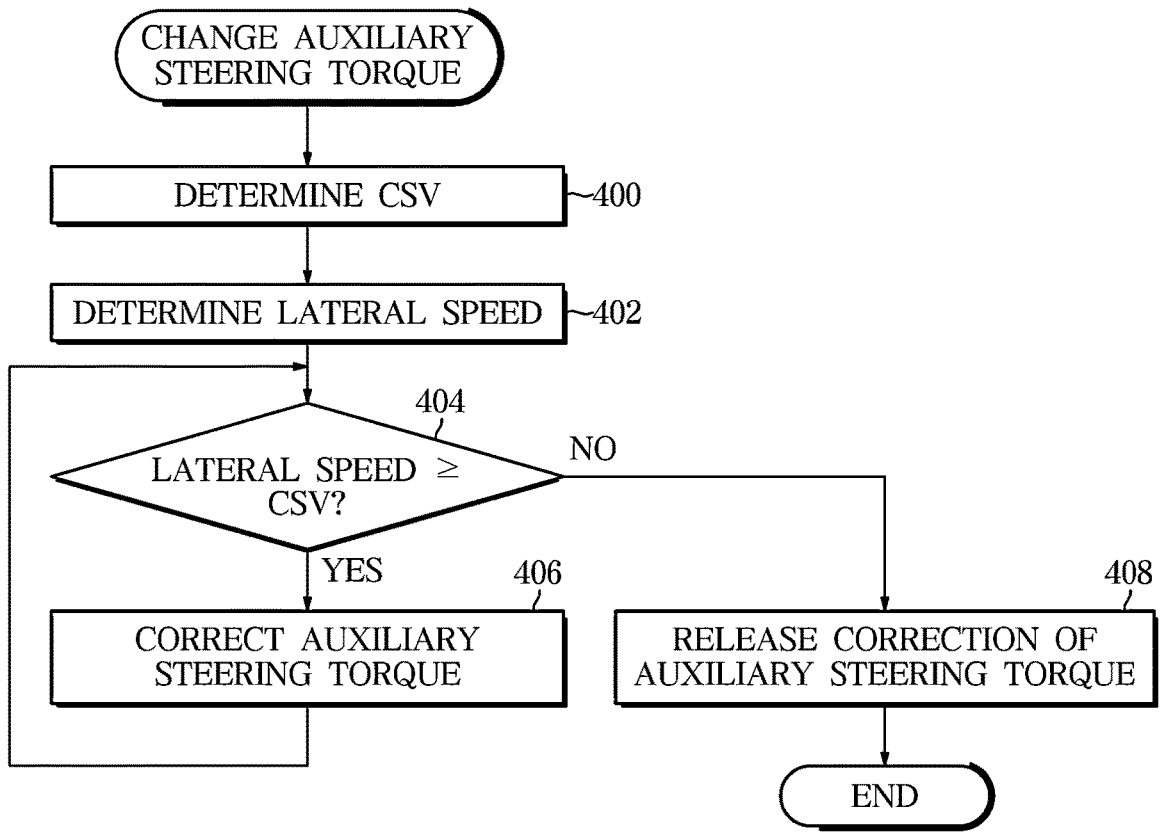

[FIG. 7]
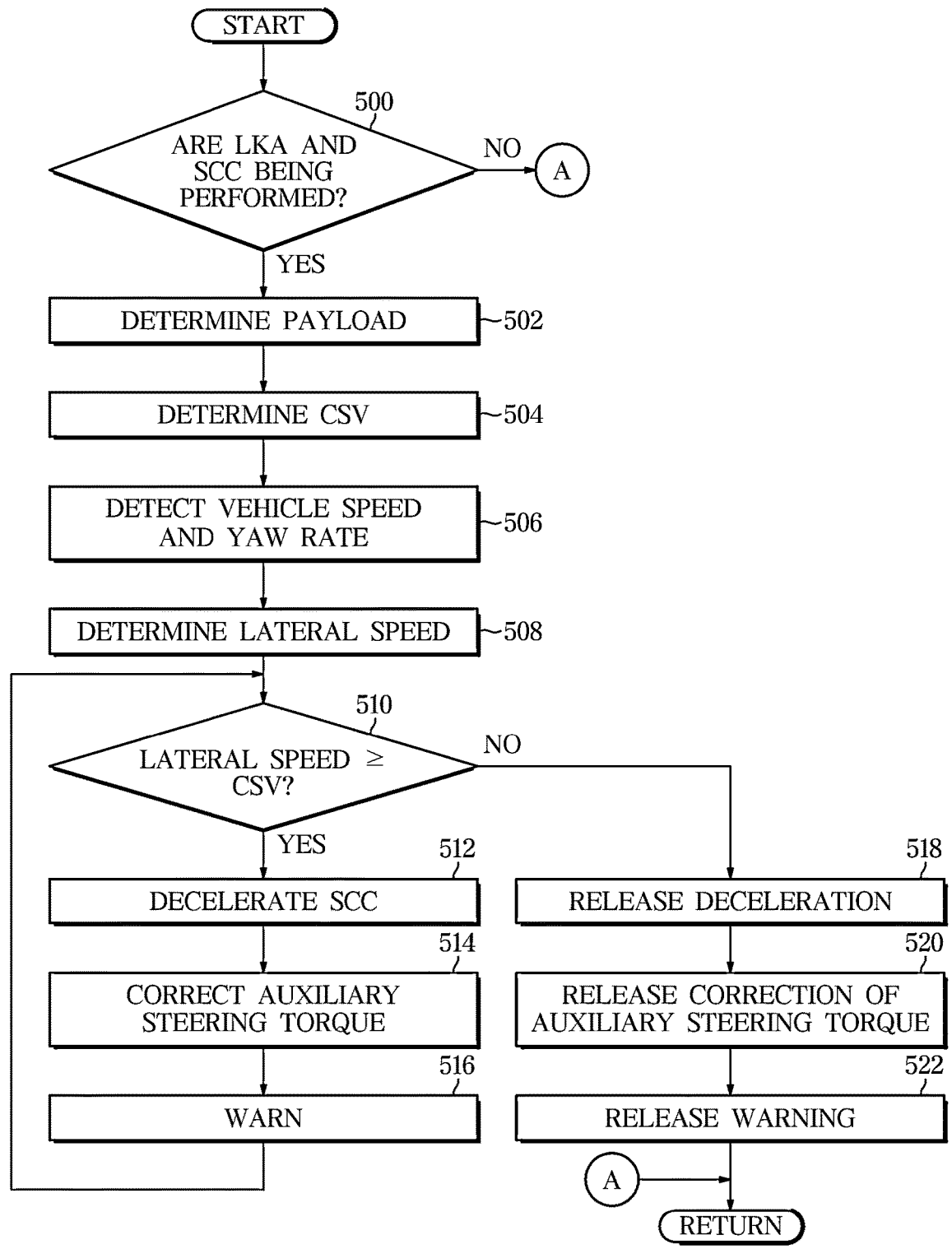

DRIVER ASSISTANCE SYSTEM AND DRIVER ASSISTANCE METHOD

CROSS-REFERENCE TO RELATED APPLICATION(S)

This application is based on and claims priority under 35 U.S.C. § 119 to Korean Patent Application No. 10-2021-0091092, filed on Jul. 12, 2021, in the Korean Intellectual Property Office, the disclosure of which is incorporated by reference herein in its entirety.

BACKGROUND

1. Field

The disclosure relates to a driver assistance system and a driver assistance method.

2. Description of the Related Art

In general, a driver assistance system, so-called advanced driver assistance system (ADAS), is a technology that assists a driver by recognizing a specific situation occurring while driving and controlling a mechanical device.

As the ADAS, a smart cruise control (SCC) that automatically accelerates or decelerates and maintains a distance by detecting a vehicle in front, a lane keeping assistance system (LKAS) that prevents a vehicle from departing from a lane by automatically steering a steering wheel, and the like are known.

A payload of a vehicle affects an LKA function.

Because the LKA function has been developed based on a weight of an evaluation criteria of accredited evaluation agencies such as NTHSA and E-NCAP, when the LKA function is applied to a vehicle in which the payload varies greatly, such as a gross vehicle weight (GVW) or a commercial vehicle capable of loading a large number of cargoes, it is difficult to secure the stability of the LKA function.

Japanese Patent Publication No. 2004-338637 (Published on Dec. 2, 2004) has been disclosed as an example of a conventional driver assistance system and driver assistance method.

SUMMARY

It is an aspect of the disclosure to provide a driver assistance system and a driver assistance method capable of ensuring the stability of an LKA function regardless of a change in payload.

Additional aspects of the disclosure will be set forth in part in the description which follows and, in part, will be obvious from the description, or may be learned by practice of the disclosure.

In accordance with an aspect of the disclosure, a driver assistance system includes a camera installed in a vehicle, the camera having a field of view around the vehicle and obtaining an image data; and a controller configured to process the image data. The controller performs a lane keeping assistance control for providing an auxiliary steering torque to a steering actuator to maintain a driving lane of a vehicle. The controller changes at least one of a vehicle speed and the auxiliary steering torque depending on a payload of the vehicle during the lane keeping assistance control.

The controller may compare a lateral speed of the vehicle with a critical sliding velocity (CSV) of the vehicle and change at least one of the vehicle speed and the auxiliary steering torque when the lateral speed is higher than the critical sliding velocity.

The controller may decelerate the vehicle speed so that the lateral speed is lower than the critical sliding velocity.

The controller may decelerate a speed of a smart cruise control (SCC) through the SCC.

The controller may correct the auxiliary steering torque so that the lateral speed is lower than the critical sliding velocity.

The controller may warn the driver that the lateral speed is a dangerous speed through a human machine interface (HMI) when the lateral speed is higher than the critical sliding velocity.

The controller may determine the critical sliding velocity depending on the payload.

The controller may determine the lateral speed depending on a vehicle speed detected by a vehicle speed sensor of the vehicle and a yaw rate detected by a yaw rate sensor of the vehicle.

The vehicle may be a commercial vehicle.

The driver assistance system may be a lane keeping assistance system.

In accordance with an aspect of the disclosure, a driver assistance method includes obtaining, by a camera installed in a vehicle and having a field of view around the vehicle, an image data; processing, by a processor, the image data; performing a lane keeping assistance control for providing an auxiliary steering torque to a steering actuator to maintain a driving lane of a vehicle, and changing at least one of a vehicle speed and the auxiliary steering torque depending on a payload of the vehicle during the lane keeping assistance control.

The changing of at least one of the vehicle speed and the auxiliary steering torque may include comparing a lateral speed of the vehicle with a critical sliding velocity (CSV) of the vehicle, and changing at least one of the vehicle speed and the auxiliary steering torque when the lateral speed is higher than the critical sliding velocity as a comparison result.

The changing of at least one of the vehicle speed and the auxiliary steering torque may include decelerating the vehicle speed so that the lateral speed is lower than the critical sliding velocity.

The changing of at least one of the vehicle speed and the auxiliary steering torque may include correcting the auxiliary steering torque so that the lateral speed is lower than the critical sliding velocity.

The critical sliding velocity may be determined depending on the payload, and the lateral speed may be determined depending on the vehicle speed and a yaw rate.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 1 is a control block diagram of a driver assistance system according to a first embodiment;

FIG. 2 is a configuration diagram of a vehicle to which the driver assistance system according to the first embodiment is applied;

FIG. 3 is a control flowchart of a driver assistance method according to the first embodiment;

FIG. 4 is a control flowchart for performing a change in vehicle speed in the driver assistance system according to the first embodiment;

FIG. 5 is a control flowchart of a driver assistance method according to a second embodiment;

FIG. 6 is a control flowchart for performing a change in auxiliary steering torque in a driver assistance system according to the second embodiment; and FIG. 7 is a control flowchart of a driver assistance method according to a third embodiment.

DETAILED DESCRIPTION

Like reference numbers refer to like elements throughout this specification. This specification does not describe all components of the embodiments, and general contents in the technical field to which the disclosure belongs or overlapping contents between the embodiments will not be described. The terms "part," "module," "member," and "block" as used herein, may be implemented as software or hardware, and according to embodiments, a plurality of "parts," "modules," "members," or "blocks" may be implemented as a single component, or a single "portion," "module," "member," or "block" may include a plurality of components.

Throughout this specification, when a portion is "connected" to another portion, this includes the case in which the portion is indirectly connected to the other portion, as well as the case in which the portion is directly connected to the other portion, and the indirect connection includes a connection through a wireless communication network.

Also, it will be understood that the terms "includes," "comprises," "including," and/or "comprising," when used in this specification, specify the presence of a stated component, but do not preclude the presence or addition of one or more other components.

In the present specification, it will also be understood that when an element is referred to as being "on" or "over" another element, it may be directly on the other element or intervening elements may also be present.

It will be understood that although the terms first, second, etc. may be used herein to describe various components, these components should not be limited by these terms, and the terms are only used to distinguish one component from another. The singular expressions herein may include plural expressions, unless the context clearly dictates otherwise.

Reference numerals used in operations are provided for convenience of description, without describing the order of the operations, and the operations may be executed in a different order from the stated order unless a specific order is definitely specified in the context.

FIG. 1 is a control block diagram of a driver assistance system according to a first embodiment, and FIG. 2 is a configuration diagram of a vehicle to which the driver assistance system according to the first embodiment is applied.

Referring to FIGS. 1 and 2, the driver assistance system may include an environment sensor 10, a vehicle state sensor 20, an SCC switch 30, and an LKA switch 40.

The environment sensor 10 may be mounted outside and/or inside a vehicle V.

The environment sensor 10 may include a camera 11 and a radar 12. The camera 11 may be mounted toward the front at an upper portion of a windshield in the inside of the vehicle V. The radar 22 may be mounted on a front bumper of the vehicle V.

The vehicle state sensor 20 may be mounted inside the vehicle V.

The vehicle state sensor 20 may include an accelerator pedal sensor 21, a brake pedal sensor 22, a steering angle sensor 23, a vehicle speed sensor 24, and a yaw rate sensor 25. The accelerator pedal sensor 21 detects an acceleration intention of a driver from an amount of stepping on an accelerator pedal. The brake pedal sensor 22 detects a braking intention of the driver from the amount of stepping on the brake pedal. The steering angle sensor 23 detects a steering intention of the driver from a steering angle of the steering wheel. The vehicle speed sensor 24 detects a speed of the vehicle V. The yaw rate sensor 25 detects a yaw rate of the vehicle V.

The SCC switch 30 is turned on or off by the driver, and is a switch for turning on or off an SCC function for controlling the vehicle speed to maintain an inter-vehicle distance between a host vehicle and a preceding vehicle at a preset distance.

The LKA switch 40 is turned on or off by the driver, and is a switch for turning on or off a lane keeping function for maintaining a lane so that the host vehicle does not deviate from the driving lane.

The driver assistance system also includes a controller 50 configured to perform overall control. The environment sensor 10, the vehicle state sensor 20, the SCC switch 30, and the LKA switch 40 are electrically connected to the controller 50.

The controller 50 may control a steering actuator 60, an engine 70, a brake 80, and a human machine interface (HMI) 90 based on signals input from the environment sensor 10, the vehicle state sensor 20, the SCC switch 30 and the LKA switch 40 to perform an LKA function and/or the SCC function. The controller 50 may also perform guidance and warning for the LKA function and/or the SCC function.

The controller 50 includes a processor 51 and a memory 52.

The processor 51 performs overall control of the driver assistance system.

The processor 51 includes at least one processor. The processor 51 may be integrated into at least one integrated circuit or implemented as a separate component.

The memory 52 may include not only a volatile memory such as a S-RAM and a D-RAM, but also a non-volatile memory such as a flash memory, a read-only memory (ROM), and an erasable programmable read-only memory (EPROM).

A program for controlling an operation of the driver assistance system and data generated during execution of the program are stored in the memory 52.

The vehicle V to which the driver assistance system according to the first embodiment is applied may be a commercial vehicle such as a van and a truck. The vehicle V may also be a passenger car such as a sport utility vehicle (SUV).

FIG. 3 is a control flowchart of a driver assistance method according to the first embodiment.

Referring to FIG. 3, the controller 50 determines whether the LKA switch 40 is turned on by the driver (100).

When the LKA switch 40 is turned on (100: YES), the controller 50 recognizes a lane in which the vehicle V travels by analyzing front images captured by the camera 11 (102).

On the other hand, when the LKA switch 40 is turned off (100: NO), the controller 50 moves to a preset routine.

The controller 50 performs a lane keeping assistance control (LKA control) for applying an auxiliary steering torque to the steering actuator 60 to maintain the lane in which the vehicle V travels (104).

The controller 50 determines a payload of the vehicle V (106). When there is a large amount of load in a luggage compartment of the vehicle V, the camera 11 installed in the vehicle V is lifted upward compared to a case where there is a small amount of load, so that a difference occurs in the front images captured by the camera 11. By comparing this difference in the front images, the payload may be estimated. The payload may also be detected through a load sensor installed in the vehicle V.

The controller 50 changes the vehicle speed depending on the payload (108).

As such, by changing the vehicle speed depending on the payload of the vehicle V during the LKA control, the stability of the LKA function may be secured even when the payload of the vehicle V is varied.

FIG. 4 is a control flowchart for performing a change in vehicle speed in the driver assistance system according to the first embodiment.

Referring to FIG. 4, the controller 50 determines a critical sliding velocity (CSV) that is a critical sliding speed of the vehicle V (200).

The CSV is a minimum lateral speed at the moment when a vehicle is about to overturn by sliding on a curb or the like. The CSV may be determined from a vehicle mass. The CSV decreases as the vehicle mass increases.

The CSV may be determined by the following equation [1].

$$CSV = \sqrt{\frac{2gI_{axx}}{MH^2}\left(\sqrt{\left(\frac{T^2}{4} + H^2\right)} - H\right)} \qquad \text{Equation [1]}$$

Herein, CSV is a critical sliding speed (km/h), g is a gravitational acceleration (m/s2), M is a vehicle mass (kg), T is a vehicle track width (mm), H is a vehicle center of gravity height (mm), and Iaxx is a roll moment of inertia (kg-m$^2$) of a pivot point on the outside of a tire calculated using the parallel axis theory.

The Iaxx is determined by the following equation [2].

$$I_{axx} = I_{xx} + M\left(\frac{T^2}{4} + H^2\right) \qquad \text{Equation [2]}$$

Herein, Ixx is a roll moment of inertia (kg-m$^2$) of the vehicle center of gravity height.

Also, the CSV may be determined depending on the vehicle speed and vehicle mass.

The controller 50 determines a lateral speed of the vehicle V (202). The lateral speed of the vehicle V may be determined from the vehicle speed detected by the vehicle speed sensor 24 and the yaw rate detected by the yaw rate sensor 25. The lateral speed is preset depending on the vehicle speed and yaw rate. The lateral speed may also be estimated using a lateral acceleration sensor.

The controller 50 determines whether the lateral speed is greater than or equal to the CSV by comparing the lateral speed with the CSV (204).

When the lateral speed is equal to or greater than the CSV (204: YES), the controller 50 controls the brake 80 to decelerate the vehicle V (206), and operation 204 is performed.

On the other hand, when the lateral speed is less than the CSV (204: NO), the controller 50 releases the deceleration of the vehicle V (208). The controller 50 may increase the vehicle speed to the speed before deceleration.

As such, when the lateral speed of the vehicle V during the LKA control is higher than the CSV in which the payload is reflected, as the speed of the vehicle is decelerated, the lateral speed may be reduced to a speed lower than the CSV, so that the stability of the LKA function may be secured even in the case of the vehicle V with a variable payload.

FIG. 5 is a control flowchart of a driver assistance method according to a second embodiment.

Referring to FIG. 5, the controller 50 determines whether the LKA switch 40 is turned on by the driver (300).

When the LKA switch 40 is turned on (300: YEs), the controller 50 recognizes the lane in which the vehicle V travels by analyzing the front image captured by the camera 11 (302).

On the other hand, when the LKA switch 40 is turned off (300: NO), the controller 50 moves to a preset routine.

The controller 50 performs the lane keeping assistance control (LKA control) that applies an auxiliary steering torque to the steering actuator 60 to maintain the lane in which the vehicle V travels (304).

The controller 50 determines a payload of the vehicle V (306).

The controller 50 changes the auxiliary steering torque of the LKA control depending on the payload (308).

As such, by changing the auxiliary steering torque to be provided to the steering actuator 60 depending on the payload of the vehicle V during the LKA control, the stability of the LKA function may be secured even when the payload of the vehicle V is varied.

FIG. 6 is a control flowchart for performing a change in auxiliary steering torque in a driver assistance system according to the second embodiment.

Referring to FIG. 6, the controller 50 determines a CSV of the vehicle V (400).

The controller 50 determines a lateral speed of the vehicle V depending on a vehicle speed and a yaw rate of the vehicle V (402).

The controller 50 determines whether the lateral speed is greater than or equal to the CSV by comparing the lateral speed with the CSV (404).

When the lateral speed is equal to or greater than the CSV (404: YES), the controller 50 corrects an auxiliary steering torque to be provided to the steering actuator 60 so that the lateral speed is lower than the CSV (406). Accordingly, the corrected auxiliary steering torque is provided to the steering actuator 60, and operation 404 is performed.

On the other hand, when the lateral speed is less than the CSV (404: NO), the controller 50 releases the correction of the auxiliary steering torque (408).

As such, when the lateral speed of the vehicle V is higher than the CSV in which the payload is reflected during the LKA control, by correcting the auxiliary steering torque to be provided to the steering actuator 60, the lateral speed may be reduced to a speed lower than the CSV, so that the stability of the LKA function may be secured even in the case of the vehicle V with a variable payload.

Hereinafter, it will be described that a change in the vehicle speed and a change in the auxiliary steering torque depending on the payload of the vehicle V are performed together.

FIG. 7 is a control flowchart of a driver assistance method according to a third embodiment.

Referring to FIG. 7, the controller 50 determines whether the LKA control and the SCC control are being performed (500).

When the LKA control and the SCC control are being performed (500: YES), the controller 50 determines a payload of the vehicle V.

The controller 50 determines the CSV which is the critical sliding velocity of the vehicle (504).

The controller 50 detects the vehicle speed through the vehicle speed sensor 24 and detects the yaw rate through the yaw rate sensor 25 (506).

The controller 50 determines a lateral speed depending on the vehicle speed and the yaw rate (508).

The controller 50 determines whether the lateral speed is greater than or equal to the CSV by comparing the lateral speed with the CSV (510).

When the lateral speed is equal to or greater than the CSV (510: YES), the controller 10 reduces the speed of the SCC by controlling the SCC to decelerate the vehicle V (512). At the same time, the controller 10 corrects the auxiliary steering torque of the LKA control (514). A current auxiliary steering torque provided to the steering actuator 60 is corrected to the auxiliary steering torque for reducing the lateral speed to the CSV. Then, the controller 50 warns the driver through the HMI 90 that the current lateral speed is a dangerous speed (516). After that, the controller 50 moves to operation 510 and performs operation 510.

On the other hand, when the lateral speed is less than CSV (510: YES), the controller 10 releases the deceleration of the SCC of the vehicle V (518), releases the correction of the auxiliary steering torque (520), and releases the warning of the lateral speed (522).

As such, when the lateral speed of vehicle V during the LKA control is higher than the CSV in which the payload is reflected, the lateral speed may be reduced more quickly and stably to a lower speed than the CSV through the deceleration of the SCC and the correction of the auxiliary steering torque, so that the stability of the LKA function may be further secured even in the case of the vehicle V with a variable payload.

As is apparent from the above, the disclosure can ensure the stability of an LKA function regardless of a change in payload.

In addition, the disclosure can secure the stability and flexibility of the LKA function of a commercial vehicle with a large change in payload.

Herein, the aforementioned controller and/or components thereof may include one or more processors/microprocessors combined with a computer-readable recording medium storing computer-readable code/algorithm/software. The processors/microprocessors may execute the computer-readable code/algorithm/software stored in the computer-readable recording medium to perform the above-described functions, operations, steps, and the like.

The above-described controller and/or components thereof may further include a memory implemented as a computer-readable non-transitory recording medium or a computer-readable temporary recording medium. The memory may be controlled by the aforementioned controller and/or components thereof, and may be configured to store data transferred to or received from the aforementioned controller and/or components thereof, or may be configured to store data to be processed or processed by the aforementioned controller and/or components thereof.

The disclosed embodiments may be implemented as computer-readable code/algorithm/software on a computer-readable recording medium. The computer-readable recording medium may be a computer-readable non-transitory recording medium such as a data storage device capable of storing data readable by a processor/microprocessor. Examples of computer-readable recording media include a hard disk drive (HDD), a solid state drive (SSD), a silicon disk drive (SDD), a read-only memory (ROM), a CD-ROM, a magnetic tape, a floppy disk, an optical data storage device, etc.

What is claimed is:

1. A driver assistance system comprising
a camera installed in a vehicle, the camera having a field of view around the vehicle and obtaining an image data; and
a controller configured to process the image data,
wherein the controller is configured to perform a lane keeping assistance control for providing an auxiliary steering torque to a steering actuator to maintain a driving lane of a vehicle, and
the controller is configured to:
determine a payload of the vehicle based on a difference in front images captured by the camera,
determine a critical sliding velocity of the vehicle based on the payload of the vehicle and a vehicle speed, and
change at least one of the vehicle speed and the auxiliary steering torque depending on the payload of the vehicle and the critical sliding velocity of the vehicle during the lane keeping assistance control.

2. The driver assistance system according to claim 1, wherein the controller is configured to:
compare a lateral speed of the vehicle with the critical sliding velocity of the vehicle and
change at least one of the vehicle speed and the auxiliary steering torque when the lateral speed is higher than the critical sliding velocity.

3. The driver assistance system according to claim 2, wherein the controller is configured to decelerate the vehicle speed so that the lateral speed is lower than the critical sliding velocity.

4. The driver assistance system according to claim 3, wherein the controller is configured to decelerate a speed of a smart cruise control (SCC) through the SCC.

5. The driver assistance system according to claim 2, wherein the controller is configured to correct the auxiliary steering torque so that the lateral speed is lower than the critical sliding velocity.

6. The driver assistance system according to claim 2, wherein the controller is configured to warn the driver that the lateral speed is a dangerous speed through a human machine interface (HMI) when the lateral speed is higher than the critical sliding velocity.

7. The driver assistance system according to claim 2, wherein the controller is configured to determine the lateral speed depending on a vehicle speed detected by a vehicle speed sensor of the vehicle and a yaw rate detected by a yaw rate sensor of the vehicle.

8. The driver assistance system according to claim 1, wherein the vehicle is a commercial vehicle.

9. The driver assistance system according to claim 1, wherein the driver assistance system is a lane keeping assistance system.

10. A driver assistance method comprising:
obtaining, by a camera installed in a vehicle and having a field of view around the vehicle, an image data;
processing, by a processor, the image data;
performing a lane keeping assistance control for providing an auxiliary steering torque to a steering actuator to maintain a driving lane of a vehicle;

determining a payload of the vehicle based on a difference in front images captured by the camera;

determining a critical sliding velocity of the vehicle based on the payload of the vehicle and a vehicle speed; and changing at least one of the vehicle speed and the auxiliary steering torque depending on the payload of the vehicle and the critical sliding velocity of the vehicle during the lane keeping assistance control.

11. The driver assistance method according to claim 10, wherein the changing of at least one of the vehicle speed and the auxiliary steering torque includes:

comparing a lateral speed of the vehicle with critical sliding velocity of the vehicle; and changing at least one of the vehicle speed and the auxiliary steering torque when the lateral speed is higher than the critical sliding velocity as a comparison result.

12. The driver assistance method according to claim 11, wherein the changing of at least one of the vehicle speed and the auxiliary steering torque includes decelerating the vehicle speed so that the lateral speed is lower than the critical sliding velocity.

13. The driver assistance method according to claim 11, wherein the changing of at least one of the vehicle speed and the auxiliary steering torque includes correcting the auxiliary steering torque so that the lateral speed is lower than the critical sliding velocity.

14. The driver assistance method according to claim 11, wherein the lateral speed is determined depending on a vehicle speed and a yaw rate.

15. The driver assistance system according to claim 1, wherein the critical sliding velocity is a lateral speed in which the vehicle overturns by sliding.

16. The driver assistance system according to claim 1, wherein the critical sliding velocity of the vehicle is determined to be inversely proportional to the payload of the vehicle.

17. The driver assistance method according to claim 10, wherein the critical sliding velocity is a lateral speed in which the vehicle overturns by sliding.

18. The driver assistance method according to claim 10, wherein the critical sliding velocity of the vehicle is determined to be inversely proportional to the payload of the vehicle.

* * * * *